US011130466B2

United States Patent
McKeon

(10) Patent No.: US 11,130,466 B2
(45) Date of Patent: Sep. 28, 2021

(54) AIRBAG WITH DEPLOYMENT CONTROLLING TETHER

(71) Applicant: TRW Vehicle Safety Systems Inc., Washington, MI (US)

(72) Inventor: Courtney L. McKeon, Sterling Hts., MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 116 days.

(21) Appl. No.: 16/296,288

(22) Filed: Mar. 8, 2019

(65) Prior Publication Data

US 2020/0282945 A1   Sep. 10, 2020

(51) Int. Cl.
| | |
|---|---|
| *B60R 21/2338* | (2011.01) |
| *B60R 21/214* | (2011.01) |
| *B60R 21/232* | (2011.01) |
| *B60R 21/231* | (2011.01) |
| *B60R 21/16* | (2006.01) |

(52) U.S. Cl.
CPC ........ *B60R 21/2338* (2013.01); *B60R 21/214* (2013.01); *B60R 21/232* (2013.01); *B60R 21/23138* (2013.01); *B60R 2021/161* (2013.01); *B60R 2021/23386* (2013.01)

(58) Field of Classification Search
CPC .......... B60R 21/2338; B60R 21/23138; B60R 21/232; B60R 21/214; B60R 2021/23386; B60R 2021/161
See application file for complete search history.

(56) References Cited

U.S. PATENT DOCUMENTS

| | | | |
|---|---|---|---|
| 6,390,502 B1 * | 5/2002 | Ryan ..................... | B60R 21/232 |
| | | | 280/730.1 |
| 7,404,571 B2 * | 7/2008 | Stevens ............... | B60R 21/2171 |
| | | | 280/728.2 |
| 7,500,694 B2 | 3/2009 | Heudorfer et al. | |
| 7,712,773 B2 * | 5/2010 | Walston ................. | B60R 21/08 |
| | | | 280/730.2 |
| 7,828,322 B2 | 11/2010 | Breuninger et al. | |

(Continued)

FOREIGN PATENT DOCUMENTS

| | | | | |
|---|---|---|---|---|
| DE | 102009033022 A1 * | 3/2011 | ........... | B60R 21/213 |
| EP | 1464549 A1 * | 10/2004 | ........... | B60R 21/232 |
| WO | WO-2010008918 A1 * | 1/2010 | ......... | B60R 21/2338 |

*Primary Examiner* — James A English
*Assistant Examiner* — Kurtis Nielson
(74) *Attorney, Agent, or Firm* — Tarolli, Sundheim, Covell & Tummino LLP

(57) ABSTRACT

An apparatus for helping to protect an occupant of a vehicle includes a curtain airbag inflatable from a stored condition to a deployed condition in which the curtain airbag is positioned between a side structure of the vehicle and the vehicle occupant. The curtain airbag comprises a mounting tab for mounting the curtain airbag to a support structure of the vehicle. A tether has first and second tether end portions. The first tether end portion is connected to an inboard side of the curtain airbag at and/or adjacent to the mounting tab. The second tether end portion is connected to an outboard side of the curtain airbag. In the deployed condition of the curtain airbag, the tether is tensioned and holds a portion of the curtain airbag proximate to the second tether end portion folded in an inboard direction away from the side structure.

20 Claims, 17 Drawing Sheets

(56) References Cited

U.S. PATENT DOCUMENTS

| | | | |
|---|---|---|---|
| 7,922,193 B2 | 4/2011 | Breuninger et al. | |
| 7,967,334 B2 | 6/2011 | Breuninger et al. | |
| 8,382,151 B2 | 2/2013 | Kalandek | |
| 8,998,250 B2* | 4/2015 | Kruse | B60R 21/2338 280/730.2 |
| 9,126,558 B2* | 9/2015 | Kawamura | B60R 21/213 |
| 9,789,837 B2* | 10/2017 | Ma | B60R 21/232 |
| 2004/0188988 A1* | 9/2004 | Wipasuramonton | B60R 21/214 280/730.1 |
| 2005/0206135 A1* | 9/2005 | Nelson | B60R 21/232 280/728.2 |
| 2006/0197317 A1* | 9/2006 | Watanabe | B60R 21/213 280/728.2 |
| 2006/0202451 A1* | 9/2006 | Nakanishi | B60R 21/201 280/730.2 |
| 2009/0058053 A1* | 3/2009 | Osterhout | B60R 21/2338 280/730.2 |
| 2009/0179405 A1* | 7/2009 | Steinbach | B60R 21/237 280/730.2 |
| 2010/0107371 A1* | 5/2010 | Hofmann | B60R 21/2338 24/265 A |
| 2011/0079990 A1* | 4/2011 | Cheal | B60R 21/213 280/730.2 |
| 2013/0257026 A1* | 10/2013 | Konishi | B60R 21/23138 280/728.2 |
| 2015/0145234 A1* | 5/2015 | Wang | B60R 21/232 280/729 |
| 2016/0031404 A1* | 2/2016 | Takedomi | B60R 21/232 280/729 |
| 2016/0107602 A1* | 4/2016 | Nakashima | B60R 21/213 280/728.2 |
| 2017/0210326 A1* | 7/2017 | Miura | B60R 21/239 |
| 2018/0050652 A1* | 2/2018 | Jung | B60R 21/232 |
| 2018/0072257 A1* | 3/2018 | Hwangbo | B60R 21/2338 |
| 2018/0201220 A1* | 7/2018 | Sugimori | B60R 21/237 |
| 2018/0208146 A1* | 7/2018 | Azuma | B60R 21/213 |
| 2019/0126879 A1* | 5/2019 | Shimizu | B60R 21/213 |
| 2020/0047699 A1* | 2/2020 | Dinsdale | B60R 21/213 |

* cited by examiner

# AIRBAG WITH DEPLOYMENT CONTROLLING TETHER

FIELD OF THE INVENTION

The invention relates to an apparatus for helping to protect an occupant of a vehicle. More particularly, the invention relates to an airbag inflatable between a vehicle occupant and a side structure of a vehicle.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that is fixed to the roof of the vehicle and/or to a support structure adjacent to the roof of the vehicle. The inflatable curtain is configured to inflate from the roof of the vehicle downward inside the passenger compartment in the event of a side impact or a vehicle rollover. The inflatable curtain, when inflated, is positioned between a vehicle occupant and the side structure of the vehicle.

Portions of certain inflatable curtains in certain vehicle models are at risk of deploying on and/or outboard of the vehicle beltline. Having portions of the curtain airbag deploying on and/or outboard of the vehicle beltline is undesirable because those portions might not be positioned between a vehicle occupant and the side structure of the vehicle. Further, the at risk portions of the curtain airbag might deploy to a position that is outboard of the vehicle and provide little or no projection to the vehicle occupant. To prevent this undesirable deployment, certain inflatable curtains include tethers for controlling the deployment of the inflatable curtain.

SUMMARY OF THE INVENTION

According to one aspect, an apparatus for helping to protect an occupant of a vehicle includes a curtain airbag inflatable from a stored condition to a deployed condition in which the curtain airbag is positioned between a side structure of the vehicle and the vehicle occupant. The curtain airbag comprises a mounting tab for mounting the curtain airbag to a support structure of the vehicle. A tether has first and second tether end portions. The first tether end portion is connected to an inboard side of the curtain airbag at and/or adjacent to the mounting tab. The second tether end portion is connected to an outboard side of the curtain airbag. In the deployed condition of the curtain airbag, the tether is tensioned and holds a portion of the curtain airbag proximate to the second tether end portion folded in an inboard direction away from the side structure.

According to another aspect, alone or in combination with any other aspect, as a result of tether being connected to both the inboard side of the curtain airbag and the outboard side of the curtain airbag, the portion of the curtain airbag proximate to the second tether end can be substantially held inboard of the vehicle and restricted and/or prevented from pivoting outboard of the vehicle.

According to another aspect, alone or in combination with any other aspect, the second tether end portion can be stitched or otherwise connected to the outboard side of the curtain airbag at a lower end portion of the curtain airbag. A portion of the lower end portion can be held folded in the inboard direction away from the side structure by the tether when the curtain airbag is in the deployed condition.

According to another aspect, alone or in combination with any other aspect, a first portion of the second tether end portion can be folded over onto a second portion of the second tether end portion. The folded second tether end portion can be stitched or otherwise connected to the outboard side of the curtain airbag at the lower end portion of the curtain airbag.

According to another aspect, alone or in combination with any other aspect, the tether can be tensioned as the curtain airbag inflates and deploys to restrict and/or prevent the lower end portion of the curtain airbag from deploying outboard of the vehicle.

According to another aspect, alone or in combination with any other aspect, in the deployed condition, the tether can extend in both a rearward direction and a roofward direction from the second tether end portion to the first tether end portion. The extension of the tether in both the rearward and the roofward directions can cause the lower end portion to be further held folded in the roofward and the rearward directions.

According to another aspect, alone or in combination with any other aspect, the tension in the tether can be configured to increase when the occupant, moving in an outboard direction, impacts the curtain airbag. The increase of tension in the tether can counteract the outboard directed impact forces proximate to the second tether end to substantially prevent the portion of the curtain airbag proximate to the second tether end from moving in the outboard direction.

According to another aspect, alone or in combination with any other aspect, the second tether end portion can be stitched or otherwise connected to the outboard side of the curtain airbag at a lower end portion of the curtain airbag. As a result of the increased tension in the tether, the lower end portion of the curtain airbag can be substantially prevented from moving outboard of the vehicle.

According to another aspect, alone or in combination with any other aspect, as a result of the tether being connected to the outboard side of the curtain airbag and the inboard side of the curtain airbag at and/or adjacent to the mounting tab, the portion of the curtain airbag proximate to the second tether end portion can be held folded over onto an adjacent portion of the curtain airbag to produce a fold in the curtain airbag. The formation of the fold in the curtain airbag can cause the inboard side of the curtain airbag proximate to the second tether end portion to be folded over onto an adjacent inboard side portion of the curtain airbag so that the outboard side of the curtain airbag proximate to the second tether end portion faces in the inboard direction.

According to another aspect, alone or in combination with any other aspect, a vertical height of the tether can be less than a vertical height of the curtain airbag. As a result of the vertical height of the tether being less than the vertical height of the curtain airbag, the portion of the curtain airbag proximate to the second tether end portion can be held folded toward the first tether end portion when the curtain airbag is in the deployed condition.

According to another aspect, alone or in combination with any other aspect, the mounting tab can comprise overlying layers of airbag material with mounting tab apertures extending therethrough. The first tether end portion can include a tether aperture extending therethrough. The first tether end portion can be positioned between the overlying layers of the mounting tab with the tether aperture aligned with the mounting tab apertures.

According to another aspect, alone or in combination with any other aspect, the overlying layers of the mounting tab can comprise a first portion that is folded over onto a second portion.

According to another aspect, alone or in combination with any other aspect, the apparatus can further comprise a fastener having a portion extending though the mounting tab apertures and the tether aperture. A portion of the fastener can be configured to extend into the support structure of the vehicle to mount the apparatus to the support structure.

According to another aspect, alone or in combination with any other aspect, the apparatus can further include first and second brackets configured to be interlocked with one another. Each of the first and the second brackets can have a bracket aperture extending therethrough. The first bracket can be positioned on an inboard side of the mounting tab. The second bracket can be positioned on the outboard side of the mounting tab and interlocked with the first bracket. The first and the second bracket apertures can be aligned with the mounting tab apertures and the tether aperture.

According to another aspect, alone or in combination with any other aspect, a first portion of the first tether end portion can be folded over onto a second portion of the first tether end portion. Each of the first and the second portions of the first tether end portion can have the tether aperture extending therethrough. The folded first tether end portion can be positioned between the overlying layers of the mounting tab with the tether apertures aligned with the mounting tab apertures.

According to another aspect, alone or in combination with any other aspect, the apparatus can further include a fastener having a portion extending though the mounting tab apertures and the tether apertures. A portion of the fastener can be configured to extend into a support structure of the vehicle to mount the apparatus to the support structure.

According to another aspect, alone or in combination with any other aspect, a portion of the first tether end portion can be stitched or otherwise connected to the inboard side of the curtain airbag.

According to another aspect, alone or in combination with any other aspect, a first portion of the second tether end portion can be folded over onto a second portion of the second tether end portion. The folded second tether end portion can be stitched or otherwise connected to the outboard side of the curtain airbag.

According to another aspect, alone or in combination with any other aspect, the curtain airbag can comprise a plurality of mounting tabs spaced along the length of an upper portion of the curtain airbag. The first tether end portion can be connected to the inboard side of the curtain airbag at and/or adjacent to one of the mounting tabs.

According to another aspect, an apparatus for helping to protect an occupant of a vehicle can include a curtain airbag inflatable from a stored condition to a deployed condition in which the curtain airbag is positioned between a side structure of the vehicle and the vehicle occupant. A tether can have first and second tether end portions. The first tether end portion can be connected to an inboard side of the curtain airbag at and/or adjacent to an upper portion of the curtain airbag. The second tether end portion can be connected to an outboard side of the curtain airbag at a lower end portion of the curtain airbag. The tether can substantially prevent the lower end portion from deploying outboard of the vehicle as the curtain airbag deploys.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
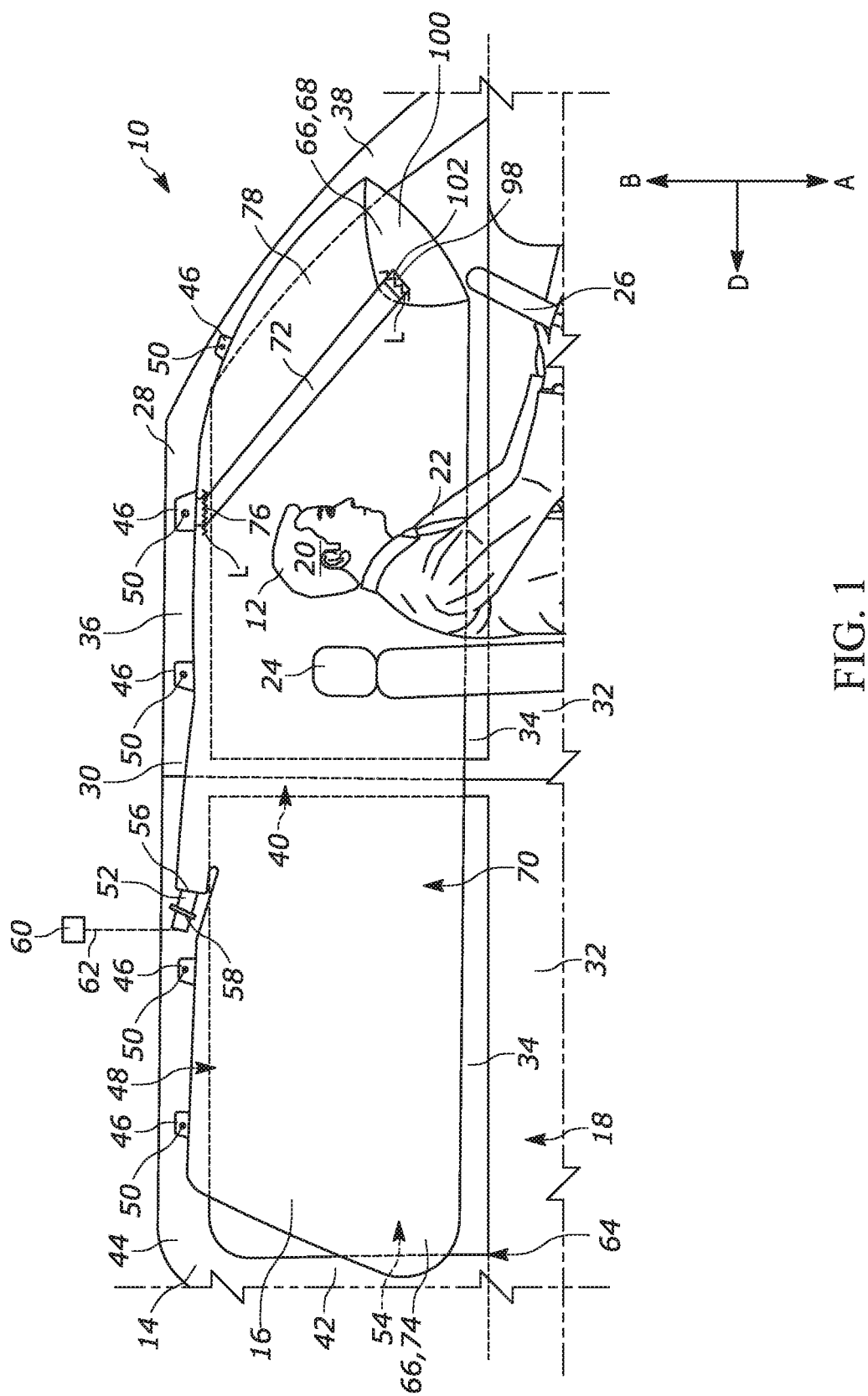
FIG. 1 is a schematic side view illustrating an apparatus for helping to protect an occupant of a vehicle.

An apparatus 10 for helping to protect an occupant 12 of a vehicle 14 includes an inflatable vehicle occupant protection device 16 in the form of an airbag, such as a curtain airbag, for helping to protect the occupant in the event of a side impact to the vehicle. In the embodiment illustrated in FIG. 1, the curtain airbag 16 is shown on a driver side 18 of the vehicle 14 for helping to protect driver side vehicle occupants. Those skilled in the art will appreciate that the apparatus 10 disclosed herein could be adapted for use on a passenger side (not shown) of the vehicle 14 for helping to protect passenger side vehicle occupants.

Portions of the occupant 12 are depicted in FIG. 1, such as the occupant's head 20 and torso 22. The vehicle 14 includes at least one vehicle seat 24 for the vehicle occupants 12, a steering wheel 26, a vehicle roof 28, and a side structure 30. The vehicle 14 has two rows of seating which help dictate the configuration of the side structure 30. In the example configuration shown in FIG. 1, the side structure 30 of the vehicle 14 includes two vehicle doors 32, two side windows 34, a roof rail 36, an A-pillar 38, a B-pillar 40, and a C-pillar 42. The apparatus 10 can, however, be applied to vehicles having any number of rows, and thus any side structure configuration.

The curtain airbag 16 can be constructed of any suitable material, such as nylon (e.g., woven nylon 6-6 yarns), and can be constructed in any suitable manner. For example, the curtain airbag 16 may have a one-piece woven (OPW) construction in which the curtain airbag is woven as a single piece of material. As another example, the curtain airbag 16 can include more than one piece of material. If more than one piece is used, the pieces can be interconnected by known means, such as stitching, ultrasonic welding, heat bonding, or adhesives, to form the curtain airbag 16. The curtain airbag 16 can be uncoated, coated with a material, such as a gas impermeable urethane, or laminated with a material, such as a gas impermeable film. The curtain airbag 16 thus can have a gas-tight or substantially gas-tight construction. Those skilled in the art will appreciate that alternative materials, such as polyester yarn, and alternatives coatings, such as silicone, can also be used to construct the curtain airbag 16.

As shown in the example configuration of FIG. 1, the curtain airbag 16 is mounted to a support structure 44 of the vehicle 14 so that at least a portion of the curtain airbag is contained in the support structure when the curtain airbag is in a stored condition. The curtain airbag 16 is inflatable and deployable from the stored condition away from the support structure 44 and toward a deployed condition in which the curtain airbag is positioned between the side structure 30 and the vehicle occupant 12. The support structure 44 can be any structure in the vehicle 14 that will accommodate the curtain airbag 16 being deployed therefrom so that the deployed curtain airbag is positioned between the side structure 30 and the vehicle occupant 12. In the example configuration shown in FIG. 1, the support structure 44 is the roof rail 36. The curtain airbag 16 can be mounted to the roof rail 36 in any manner known in the art. In the example configuration depicted in FIG. 1, the curtain airbag 16 includes a plurality of mounting tabs 46 spaced along a length of an upper portion 48 of the curtain airbag. A fastener 50 is provided at each of the mounting tabs 46 to mount the curtain airbag 16 of the apparatus 10 to the roof rail 36.

An inflator 52 is operably connected to an inflatable volume 54 of the curtain airbag 16 in any known manner. In the example configuration of FIG. 1, the curtain airbag 16 has an inflator mouth 56 in fluid communication with the inflatable volume 54. The inflator 52 is mounted to the roof rail 36 of the vehicle 14 by an inflator bracket 58 and connected to and/or received in the inflator mouth 56 of the curtain airbag 16. The inflator 52 is actuatable to provide inflation fluid to the inflatable volume 54 of the curtain airbag 16 to inflate and deploy the curtain airbag from the stored condition to the deployed condition. The inflator 52 can be of any known type, such as stored gas, solid propellant, augmented, or hybrid. An airbag controller 60 can be operatively connected to the inflator 52 via lead wires 62. The airbag controller 60 is configured to actuate the inflator 52 in response to sensing the occurrence of an event for which occupant protection is desired.

Upon the occurrence of an event for which occupant protection is desired, such as a collision, the airbag controller 60 actuates the inflator 52 to provide inflation fluid to the inflatable volume 54 of the curtain airbag 16 to inflate and deploy the curtain airbag from the stored condition to the deployed condition. The curtain airbag 16 deploys in a generally downward direction, as indicated by an arrow "A" in FIG. 1, away from the roof rail 36. In order to substantially provide proper protection to vehicle occupants 12, the curtain airbag 16 should also deploy to a position that is inboard of a beltline 64 of the vehicle 14 so that the deployed curtain airbag is positioned inboard of the vehicle between the side structure 30 and the vehicle occupant 12 (see FIGS. 1 and 8).

Certain features of the vehicle 14 and the apparatus 10 cause portions of the curtain airbag 16 to deploy to a position that is inboard of the beltline 64. As the curtain airbag 16 deploys in the downward direction A, portions of the curtain airbag can engage portions of the side structure 30 of the vehicle 14. This engagement between the side structure 30 and the curtain airbag 16 helps prevent portions of the curtain airbag from deploying to a position that is on and/or outboard of the beltline 64. For example, the pillars 38, 40, 42 engage the deploying curtain airbag 16 and help prevent portions of the curtain airbag adjacent to those pillars from being positioned on and/or outboard of the beltline 64. Further, the mounting tabs 46 along the upper portion 48 of the curtain airbag 16 hold the upper portion of the curtain airbag inboard of the beltline 64 and help prevent the upper portion of the curtain airbag from deploying to a position on and/or outboard of the beltline.

Even with the pillars 38, 40, 42 and the mounting tabs 46, without additional protections, other portions of the curtain airbag 16 can still be at risk of deploying to a position that is on and/or outboard of the beltline 64. In certain vehicle models, a lower end portion 66, such as a lower front end portion 68, at a lower portion 70 of the curtain airbag 16 can be at risk of deploying to a position that is on and/or outboard of the beltline 64. To prevent this undesirable deployment, the apparatus 10 includes a tether 72 that helps prevent a potentially at risk portion of curtain airbag 16 from deploying to a position that is on and/or outboard of the beltline 64. Although the below description largely describes the tether 72 as helping to prevent the lower front end portion 68 of the curtain airbag 16 from this undesirable deployment, those skilled in the art will appreciate that the tether could be adapted to help prevent any other portion of the curtain airbag, such as, but not limited to, a lower rear end portion 74 of the curtain airbag, from similar undesirable deployments.

The tether 72 can be formed from a length of material, such as from a single length of material or from a plurality of lengths of material that are connected to one another to collectively form the length of material. The material used to form the tether 72 can be the same material as the curtain airbag 16, or from any other appropriate material. The tether 72 has a first tether end portion 76 that is connected to an inboard side 78 of the curtain airbag 16 at and/or adjacent to the upper portion 48 of the curtain airbag by known means, such as by stitching, ultrasonic welding, heat bonding, adhesives, fasteners, or any combination thereof. In the example configuration depicted in FIGS. 2-3, the first tether end portion 76 is connected to the upper portion 48 of the curtain airbag 16 at one of the mounting tabs 46.

Figure 2:
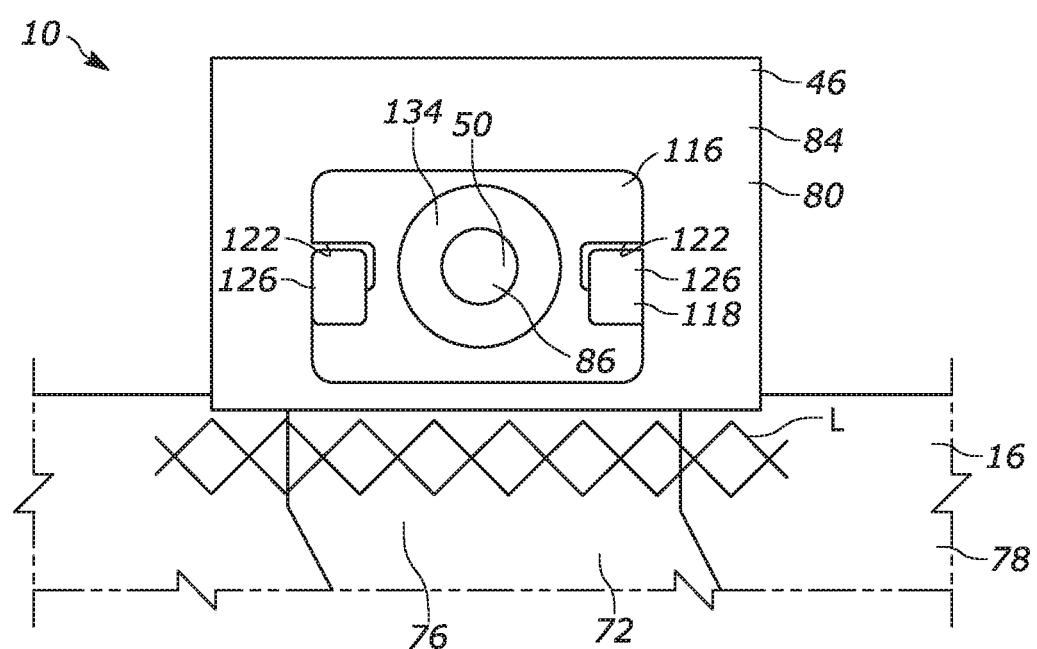
FIG. 2 is a side view of an element of the apparatus of FIG. 1.
Figure 3:
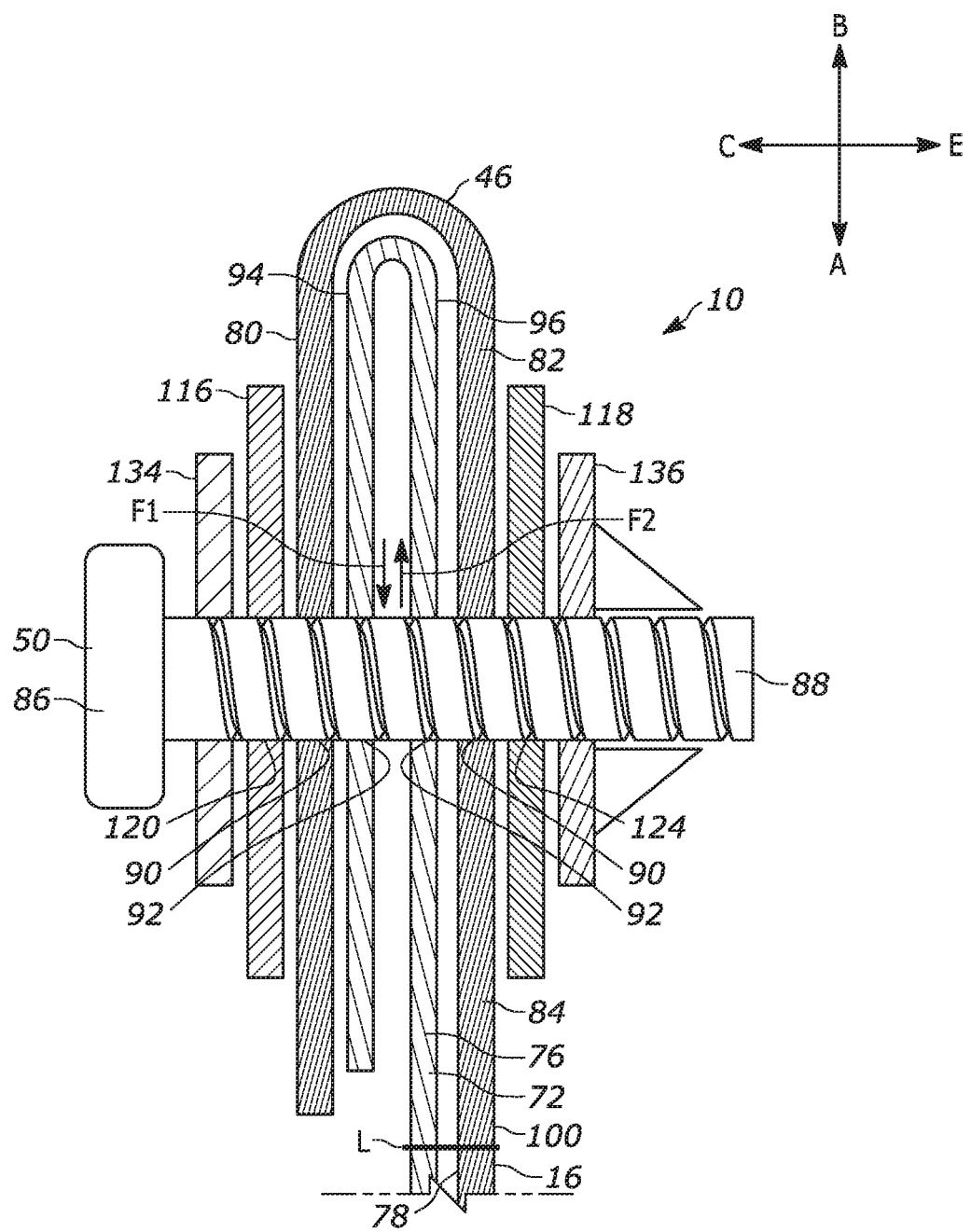
FIG. 3 is a sectional view of a portion of the apparatus of FIG. 2.

As shown in FIGS. 2-3, the mounting tab 46 can comprise an integral woven portion of an OPW curtain airbag 16. A first portion 80 of the OPW curtain airbag 16 can be folded over onto a second portion 82 to define overlying layers 84 of the mounting tab 46. A portion of the first tether end portion 76 can be positioned between the overlying layers 84 of the mounting tab 46. A portion of the fastener 50 extends through the mounting tab 46 and the tether 72 to connect the tether to the mounting tab. A portion of the fastener 50 is also configured to extend into the roof rail 36 of the vehicle 14 to mount the apparatus 10 to the roof rail.

The fastener 50 can be any fastener that is capable of withstanding deployment forces of the deploying curtain airbag 16 and capable of extending through the mounting tab 46, the first tether end portion 76, and into the roof rail 36 of the vehicle 14. In the example configuration of FIGS. 2-3, the fastener 50 is a threaded fastener, such as a bolt or screw, having a head 86 and a shank 88. The shank 88 extends through mounting tab apertures 90, which extend through each of the first and the second portions 80, 82 of the overlying layers 84, and through at least one tether aperture 92, which extends through the first tether end portion 76. To accommodate the extension of the shank 88 through the mounting tab 46 and the tether 72, the at least one tether aperture 92 is aligned with the mounting tab apertures 90 when the first tether end portion 76 is positioned between the overlying layers 84 of the mounting tab. A portion of the shank 88 is also configured to extend into the roof rail 36 of the vehicle 14 to mount the apparatus 10 to the roof rail.

As will be discussed below, during deployment, the curtain airbag 16 exerts downward deployment forces F1 onto the tether 72, which urge the first tether end portion 76 to move in the downward direction A. The fastener 50 extending through the at least one tether aperture 92 helps to prevent the first tether end portion 76 from being moved in the downward direction A and from separating from a desired position on the curtain airbag 16. For example, a portion of the downward forces F1 act on the shank 88 of the threaded fastener 50 through the at least one tether aperture 92. Because the threaded fastener 50 is held in place by being inserted into the roof rail 36, the threaded fastener counteracts the downward deployment forces F1 provided by the at least one tether aperture 92 and prevents the first tether end portion 76 from moving in the downward direction. The counteraction of the threaded fastener 50 can be seen as a force, as indicated by arrow "F2" in FIG. 3, in the roofward direction, as indicated by an arrow "B" in FIG. 3.

Figure 4:
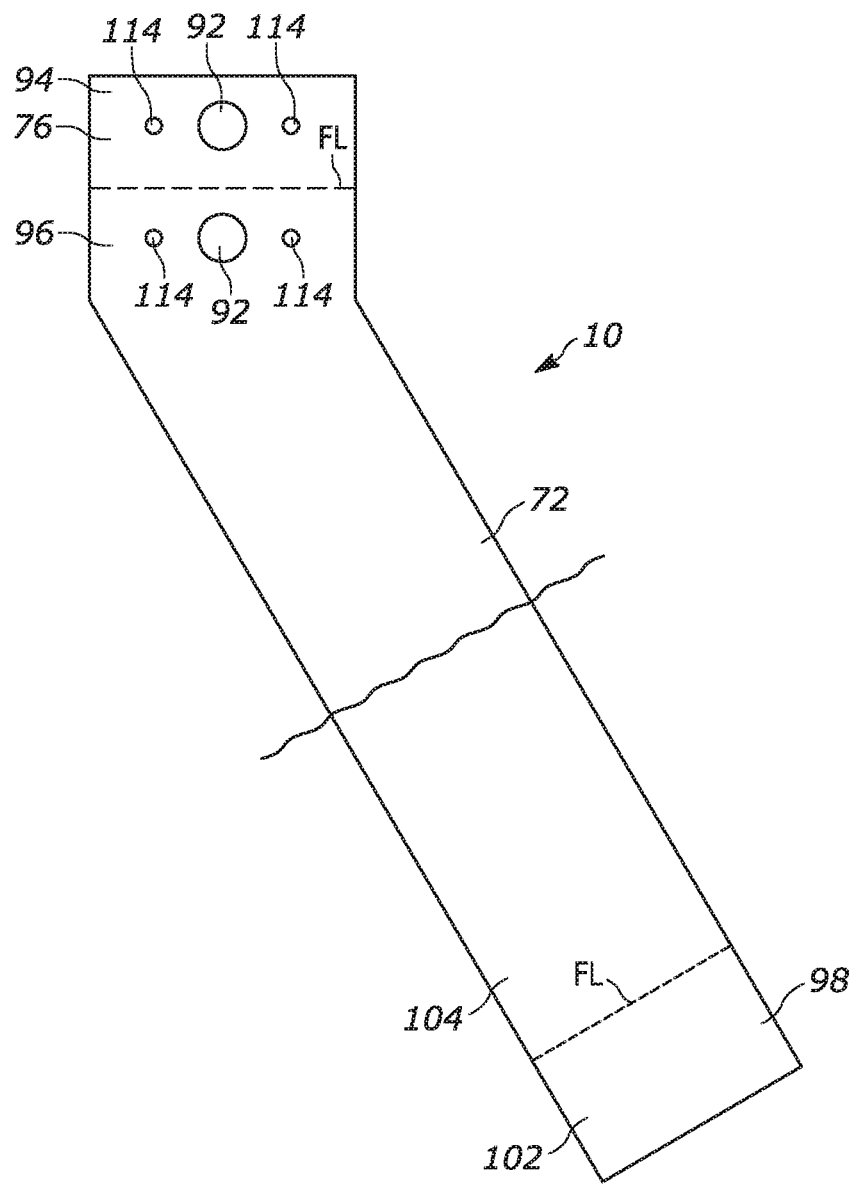
FIG. 4 is a side view of an element of the apparatus of FIG. 1.

If the tether 72 had only one tether aperture 92, the counteracting downward and roofward forces F1, F2 at the one tether aperture could cause tears in the tether to develop at the one tether aperture. Tearing at the one tether aperture 92 could cause the tether 72 to detach from the mounting tab 46 and the apparatus 10 to fail. To reinforce the tether 72 and prevent tears from developing at a single tether aperture 92, a first portion 94 of the first tether end portion 76 can be folded over onto a second portion 96 of first tether end portion. As shown in FIG. 4, each of the first and the second portions 94, 96 of the first tether end portion include the tether aperture 92. Once the first portion 94 of the first tether end portion 76 is folded over a fold-line, indicated at "FL" in FIG. 4, onto the second portion 96 of the first tether end portion, the tether aperture 92 on the first portion is aligned with the tether aperture on the second portion. As shown in FIG. 3, the folded first tether end portion 76 is positioned between the overlying layers 84 of the folded mounting tab 46 with the tether apertures 92 aligned with the mounting tab apertures 90. In this configuration, the fastener 50 extends through the mounting tab apertures 90 and the tether apertures 92.

As a result of both of the first and the second portions 94, 96 of the first tether end portion 76 having the tether apertures 92 through which the shank 88 of the fastener 50 extends, the counteracting downward and roofward forces F1, F2 are split between each of the tether apertures of the first and the second portions of the first tether portion instead of being exerted on a single tether aperture. This split prevents the entire load of the counteracting downward and roofward forces F1, F2 from being exerted on a single tether aperture 92, and thus helps to minimize the development of tears at the tether apertures.

In addition to being connected to the mounting tab 46, a portion of the first tether end portion 76 can be stitched or otherwise connected to the inboard side 78 of the curtain airbag 16 adjacent to an upper portion 48 of the curtain airbag. In the example configuration shown in FIGS. 1-3, a portion of the first tether end portion 76 is stitched, as indicated by the stitch/connection lines "L" in FIGS. 1-3, to the inboard side 78 of the curtain airbag 16 adjacent to the mounting tab 46 in which the first tether end portion is connected. The stitching of the first tether end portion 76, in addition to the fastener 50, substantially prevents the first tether end portion from being moved in the downward direction A. Thus, the stitching of the first tether end portion 76 provides an additional level of reinforcement. Although the first tether end portion 76 has been described as being connected to one of the mounting tabs 46 through the fastener 50 and stitched to the inboard side 78 of the curtain airbag 16, those skilled in the art will appreciate that the first tether end portion can be connected to the inboard side of the curtain airbag through only one of described methods and/or through any method known in the art.

The tether 72 further includes a second tether end portion 98 that is connected to an outboard side 100 of the curtain airbag 16 by known means, such as by fasteners, stitching, ultrasonic welding, heat bonding, adhesives, or any combination thereof. In the example configuration depicted in FIG. 1, the second tether end portion 98 is stitched or otherwise connected, as indicated by the stitch/connection line "L" in FIG. 1, to the outboard side 100 of the curtain airbag 16 at the lower front end portion 68 of the curtain airbag. In order to reinforce the second tether end portion 98 and the connection between the second tether end portion and the curtain airbag 16, a first portion 102 of the second tether end portion can be folded over a fold-line, indicated at "FL" in FIG. 4, onto a second portion 104 of the second tether end portion prior to being stitched or otherwise connected to the curtain airbag (see FIGS. 1 and 4). As shown in FIG. 1, the folded second tether end portion 98 can then be stitched to the outboard side 100 of the curtain airbag 16 at the lower front end portion 68 of the curtain airbag.

Figure 5:
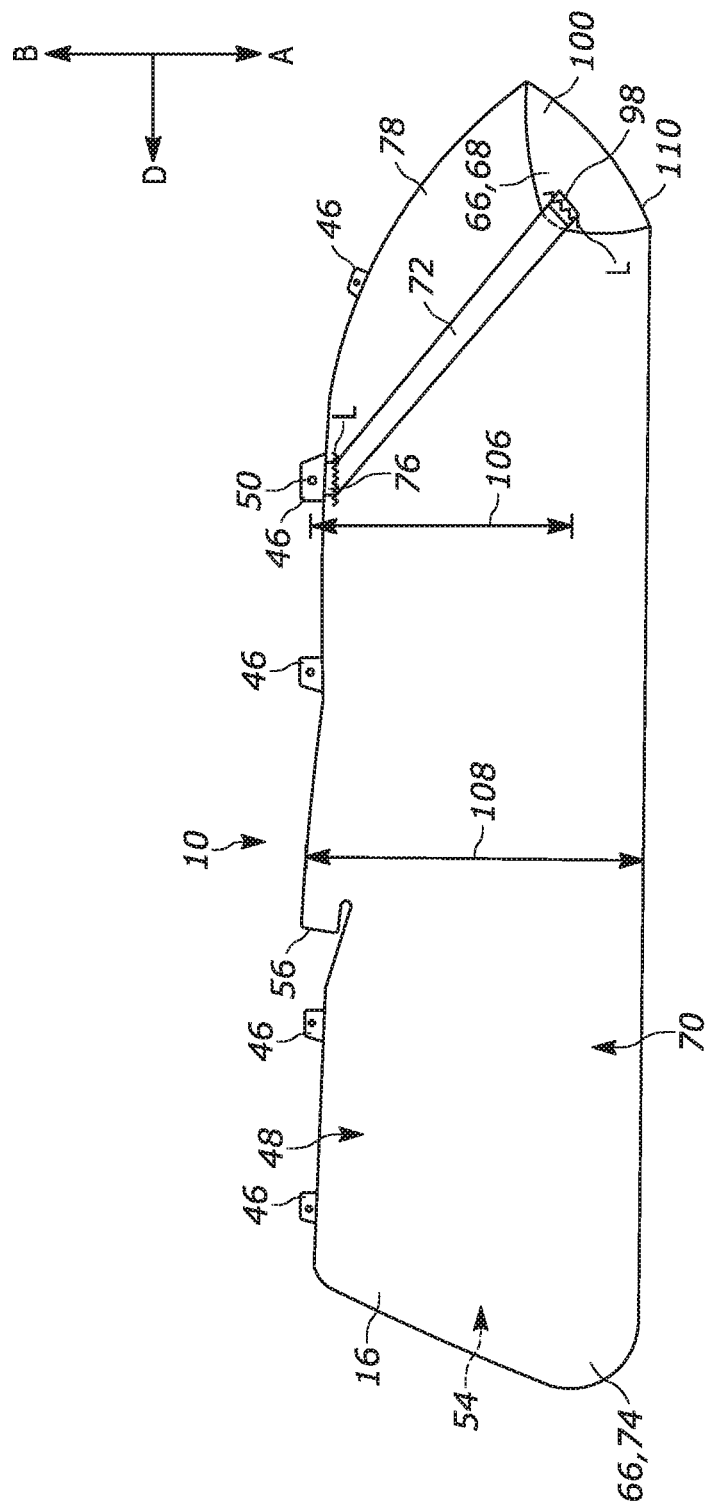
FIG. 5 is a side view of a portion of the apparatus of FIG. 1.
Figure 6:
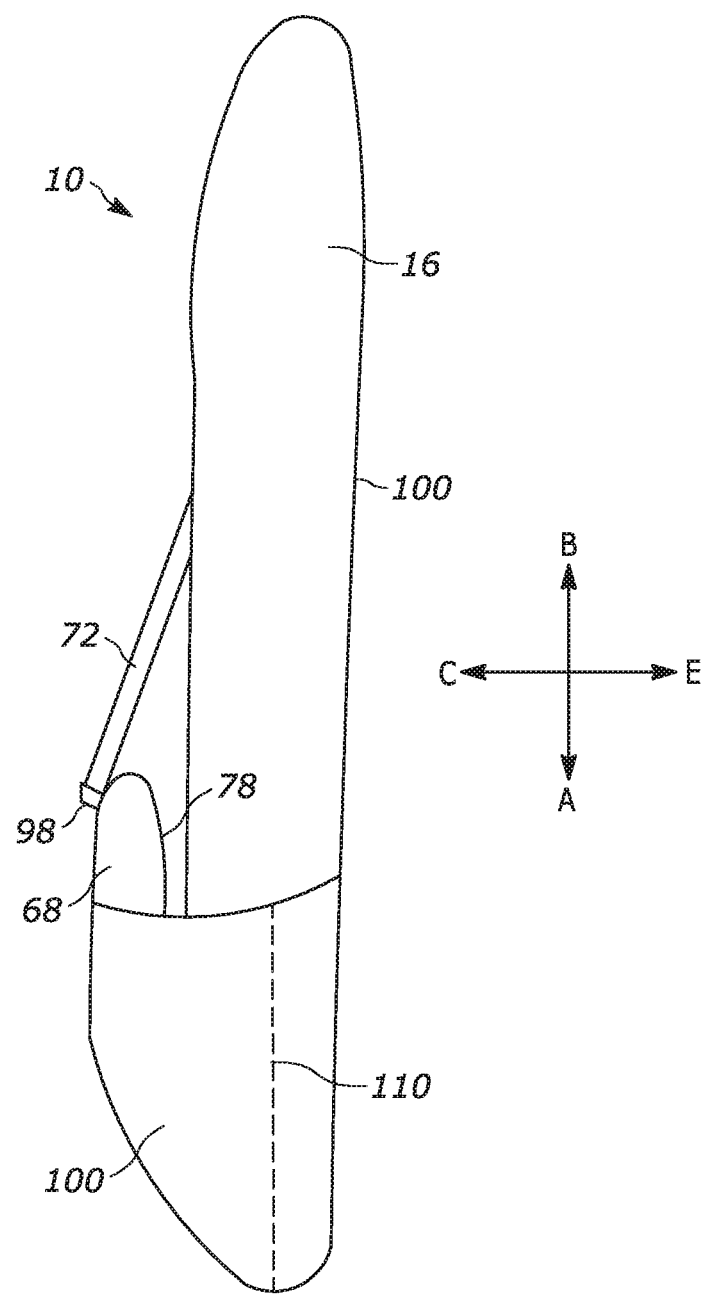
FIG. 6 is a front view of a portion of the apparatus of FIG. 5.

FIGS. 5-6 depict the tether 72 connected to the curtain airbag 16 before the curtain airbag is rolled/folded and attached to the roof rail 36. As shown, the first tether end portion 76 is connected to the inboard side 78 of the curtain airbag at and/or adjacent to one of the mounting tabs 46. In the example configuration shown in FIG. 5, a vertical height 106 of the tether 72 is less than a vertical height 108 of the curtain airbag 16. The vertical heights 106, 108 of the tether 72 and the curtain airbag 16 are measured in a vehicle up-down direction B-A (the combination of the roofward and the downward directions B, A). Thus, for example, even though the tether 72 extends diagonally, its vertical height 106 is a vertical, vehicle up-down B-A component of that diagonal extension. Due to this height difference, the outboard side 100 of the lower front end portion 68 of the curtain airbag 16 is folded toward the first tether end portion 76 to accommodate the connection of the second tether end portion to the outboard side of the curtain airbag at the lower front end portion. Because the first tether end portion 76 is connected to the inboard side 78 of the curtain airbag, the outboard side 100 of the lower front end portion 68 of the curtain airbag 16 is folded in an inboard direction, as indicated by an arrow "C" in FIG. 6, toward the first tether end portion to produce a fold 110 in the curtain airbag. The formation of the fold 110 results in the inboard side 78 of the curtain airbag 16 at the lower front end portion 68 being folded over onto an adjacent inboard side portion of the curtain airbag so that the outboard side 100 of the curtain airbag at the lower front end portion faces in the inboard direction C.

In the example configuration of FIGS. 5-6, the first tether end portion 76 is also in a position that is spaced in a rearward direction, as indicated by an arrow "D" in FIG. 5, and the roofward direction B from the lower front end portion 68 of the curtain airbag 16. As a result of this configuration, the outboard side 100 of the curtain airbag 16 at the lower front end portion 68 is also folded in both the roofward and rearward directions B, D toward the first tether end portion 76 to accommodate the connection of the second tether end portion 98 to the outboard side 100 of the curtain airbag 16 at the lower front end portion of the curtain airbag. The lower front end portion 68 of the curtain airbag 16 is thus folded in the inboard, the roofward, and the rearward directions C, B, D onto an adjacent portion of the curtain airbag so that the tether 72 can extend in both the rearward and roofward directions from the second tether end portion 98 to the first tether end portion 76. The curtain airbag 16 can then be rolled/folded in any desired manner and attached to the roof rail 36 to place the curtain airbag in the stored condition. In the example configuration, the curtain airbag 16 is rolled in the outboard direction, as indicated by an arrow "E" in FIG. 6. Those skilled in the art, however, will understand that the curtain airbag 16 can be rolled in the inboard direction C or folded in any other manner.

As the curtain airbag 16 deploys in the downward direction A to the position depicted in FIG. 1, due to the downward deployment forces F1, the lower front end portion 68 of the curtain airbag pulls the second tether end portion 98 downward. As a result, the tether 72 becomes tensioned between the first and the second tether end portions 76, 98. The tensioned tether 72 thus counteracts the downward deployment forces F1 applied by the deploying curtain airbag 16. This counteraction can be seen as a force, as indicated by an arrow "F2" in FIG. 7, in the roofward direction B. As the tether 72 becomes tensioned, it eventually prohibits the lower front end portion 68 of the curtain airbag 16 from further deployment in the downward direction A.

The difference in vertical heights 106, 108 ("height differential") between the tether 72 and the curtain airbag 16 results in the tether becoming tensioned prior to the curtain airbag unfurling/unfolding completely. In particular, the height differential causes the tether 72 to become tensioned prior to the complete unfurling/unfolding of the lower front end portion 68 of the curtain airbag 16, and portions of the curtain airbag adjacent to the lower front end portion. Thus, the tether 72 restricts and/or prevents at least the lower front end portion 68 of the curtain airbag 16 from completely unfurling/unfolding. Although the vertical height 106 of the tether 72 has been described as being less than the vertical height 108 of the curtain airbag 16, the tether can have any desired vertical height as long as the tether is appropriately tensioned to restrict and/or prevent a desired portion of the curtain airbag from completely unfurling/unfolding.

Figure 7:
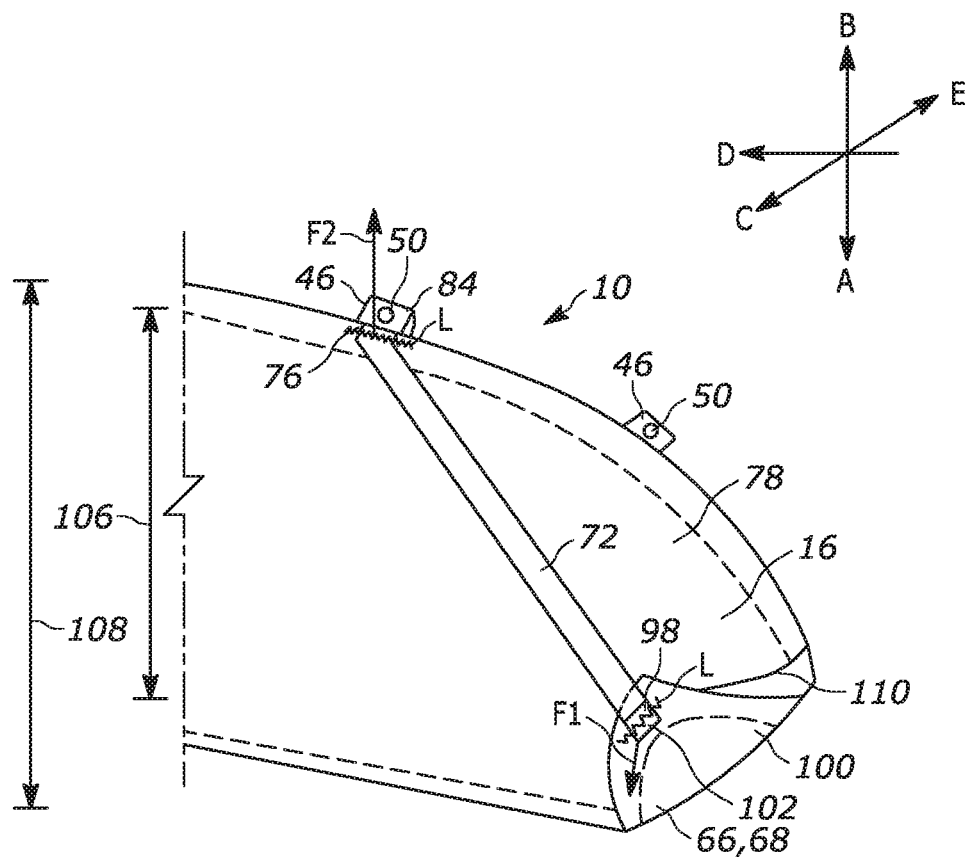
FIG. 7 is a side view of a portion of the apparatus of FIG. 1.

As the curtain airbag 16 inflates and deploys, the tether 72 restricts and/or prevents the lower front end portion 68 of the curtain airbag from fully unfurling/unfolding. In doing so, the tether 72 helps maintain the fold 110 in the lower front end portion 68. The lower front end portion 68 of the curtain airbag 16, and/or a portion of the curtain airbag proximate to the second tether end portion 98, is thus held folded in the inboard, the roofward, and the rearward directions C, B, D toward adjacent portions of the curtain airbag. As shown in FIG. 7, when the curtain airbag 16 is in the deployed condition, the inboard side 78 of the curtain airbag at the lower front end portion 68 is folded over onto an adjacent portion of the curtain airbag, and the outboard side 100 of the curtain airbag at the lower front end portion faces in the inboard direction C.

Figure 8:
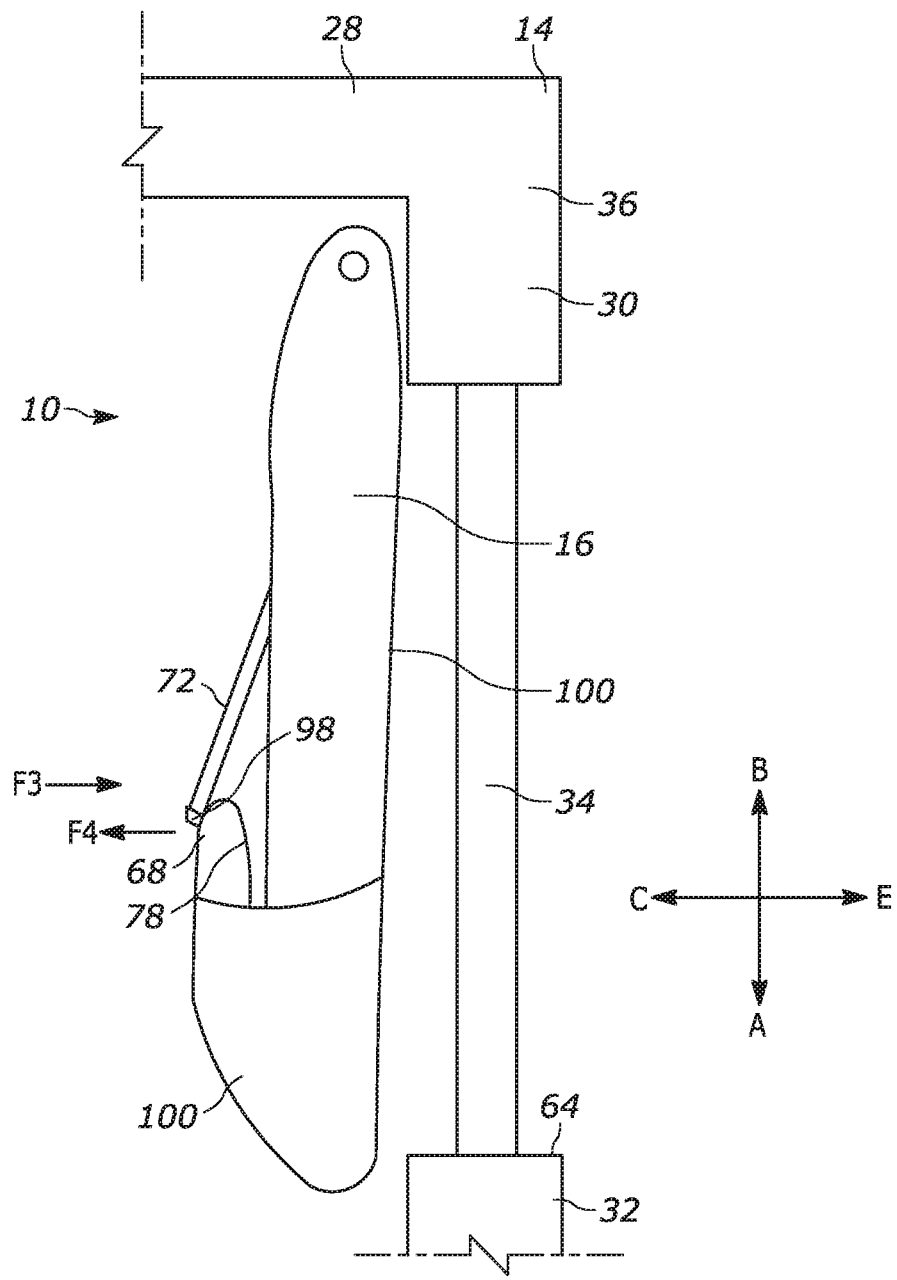
FIG. 8 is a schematic front view of a portion of the apparatus of FIG. 1.

As shown in FIG. 8, the tether 72 thus holds the lower front end portion 68, and/or a portion of the curtain airbag proximate to the second tether end portion 98, of the curtain airbag 16 folded in the inboard direction C away from the side structure 30 of the vehicle 14 and away from the beltline 64. This causes the lower front end portion 68 of the curtain airbag 16 to deploy to a position that is inboard of the beltline 64, and accordingly inboard of the vehicle 14. In holding the lower front end portion 68 of the curtain airbag 16 folded in the inboard direction C away from the belt line 68, the tether 72 also restricts and/or prevents the lower front end portion of the curtain airbag from pivoting in the outboard direction E toward a position that is on and/or outboard of the beltline.

Although the tether 72 has been largely described and shown as holding only the lower front end portion 68 of the curtain airbag 16 folded in the inboard direction C, the tether can also hold additional portions of the lower portion 70 of the curtain airbag folded in the inboard direction. This results in the tether 72 to holding a greater length of the lower portion 70 of the curtain airbag 16 folded in the inboard direction, and thus ensuring that a greater length of the lower portion of the curtain airbag deploys to a position that is inboard of the beltline 64. Further, although the first tether end portion 76 has been described as being connected to the inboard side 78 of the curtain airbag 16 at and/or adjacent to the upper portion 48 of the curtain airbag, the first tether end portion can be connected to the inboard side of the curtain airbag at any desired location that will appropriately restrict and/or prevent a desired portion of the curtain airbag from completely unfurling/unfolding.

In addition to the tether 72 substantially preventing portions of the curtain airbag 16 from deploying to an undesirable position, the tether also supports the curtain airbag against the force of impacts when the curtain airbag is in the deployed condition. In certain collisions, the occupant 12 can be moved in the outboard direction E to impact the deployed curtain airbag. As shown in FIG. 8, the outboard moving occupant 12 thus provides a force, as indicated by an arrow "F3" in FIG. 8, in the outboard direction E to the deployed curtain airbag. Portions of the side structure 30 that are positioned against and/or adjacent to the outboard side 100 of the deployed curtain airbag 16 provide a reaction surface for supporting the curtain airbag against these outboard forces. However, other portions of the deployed curtain airbag 16 may not be supported by the side structure 30, and thus can be at risk of being moved onto and/or outboard of the beltline 64 by the outboard forces F3. In certain vehicle modules, a portion of the deployed curtain airbag 16 proximate to the second tether end portion 98 can be at risk of being moved onto and/or outboard of the beltline 64 by the outboard forces F3. The tether 72 can substantially help to prevent these portions of the curtain airbag 16 from being moved onto and/or outboard of the beltline 64.

As the portion of the deployed curtain airbag 16 proximate to the second tether end portion 98 is urged in the outboard direction E, the second tether end portion is urged further away from the first tether end portion 76. As discussed above, the tension in the tether 72 increases as the second tether end portion 98 travels further away from the first tether end portion 76. The second tether end portion 98 is substantially prevented from moving further away from the first tether end portion 76 once the tether 72 becomes tensioned. Because the tether 72 is tensioned when the curtain airbag 16 is in the deployed condition, the second tether end portion 98 is substantially prevented from being moved any further away from the first tether end portion 76. The tether 72 thus counteracts the outboard forces F3 acting on the curtain airbag 16 proximate to the second tether end portion 98. The counteraction of the tether 72 can be seen as a force, as indicated by an arrow "F4" in FIG. 8, in the inboard direction. This inboard counteraction force F4 of the tether 72 substantially prevents the portion of the curtain airbag 16 proximate to the second tether end portion 98 from being moved in the outboard direction E onto and/or outboard of the beltline 64. Even if a portion of the curtain airbag 16 proximate to the second tether end portion 98 is momentarily moved onto and/or outboard of the beltline 64, the inboard counteraction force F4 of the tether 72 will tend to pull that portion of the curtain airbag back inboard of the beltline.

Although the tether 72 has been largely described and shown as only preventing a portion of the curtain airbag 16 proximate to the second tether end portion 98 from moving in the outboard direction E onto and/or outboard of the beltline 64, the tether can also prevent additional portions of the lower portion 70 of the curtain airbag from being moved in the outboard direction onto and/or outboard of the beltline. This results in the tether 72 preventing a greater length of the lower portion 70 of the curtain airbag 16 from being moved onto and/or outboard of the beltline 64, and thus ensuring that a greater length of the lower portion of the curtain airbag remains in a position that is inboard of the beltline.

Figure 9:
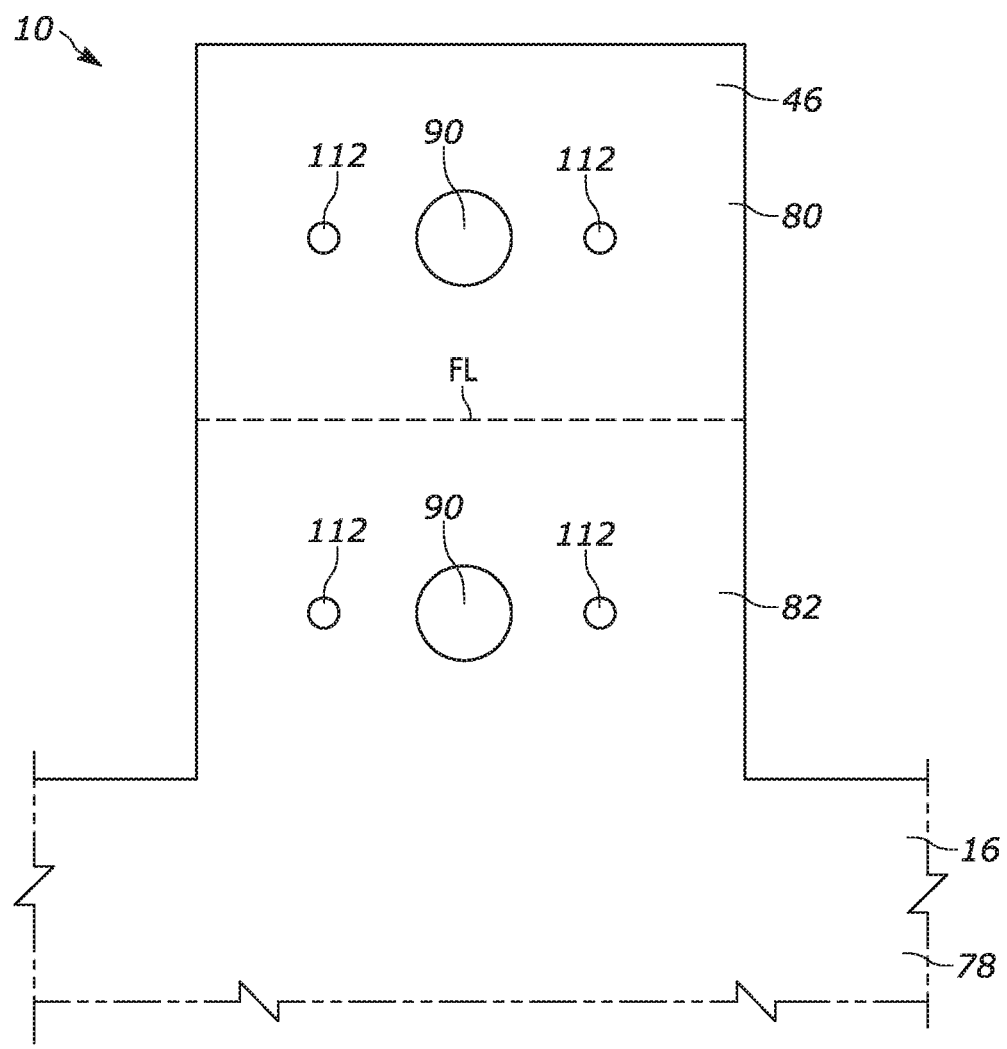
FIGS. 9-22 illustrate a method for assembling a portion of the apparatus of FIG. 1.

FIGS. 9-22 illustrate an example process by which the apparatus 10 depicted in FIG. 1 can be assembled. This example process is not intended to limit the manner in which the apparatus 10 is assembled. Those skilled in the art will appreciate that certain steps of the below example process can be performed before and/or after certain other steps of the process whether expressly stated, shown, or not. As shown in FIG. 9, the mounting tab 46 is an integral portion of an OPW curtain airbag 16 having the first and the second portions 80, 82 with the mounting tab apertures 90 extending therethrough. The mounting tab 46 depicted in FIG. 9 further includes secondary apertures 112 extending through the first and second portions 80, 82 of the mounting tab.

Figure 10:
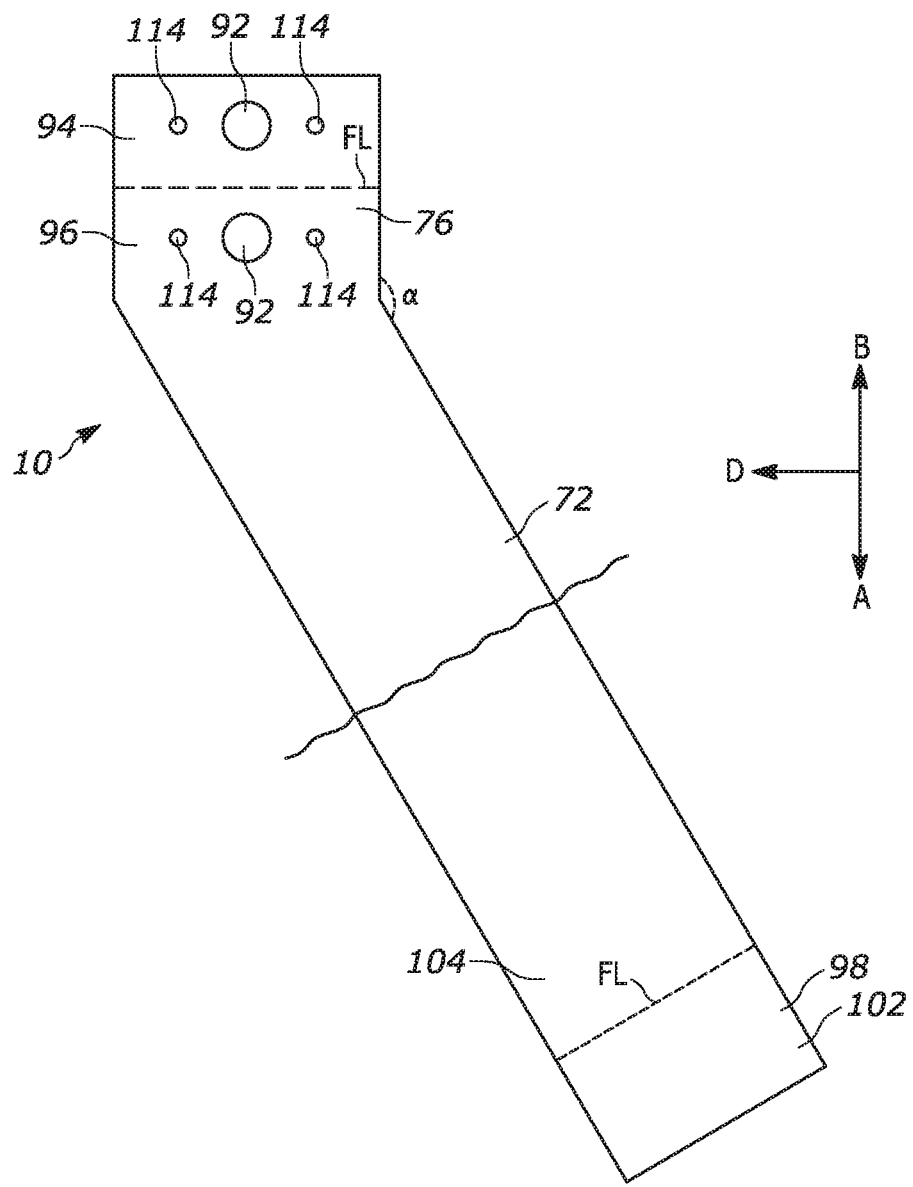

As shown in FIG. 10, the tether 72 is provided having the first and the second tether end portions 76, 98. The first end tether portion 76 can have the first and the second portions 94, 96 with the tether apertures 92 extending therethrough. The first and the second portions 94, 96 of the first tether end portion 76 further include secondary apertures 114 extending therethrough. The second tether end portion 98 is spaced from the first tether end portion 76 and arranged at a predetermined angle, as indicated by an angle "a" in FIG. 10, with respect to the first tether end portion. This angular configuration of the tether 72 allows the first end tether portion 76 to correspondingly fit with the shape of the mounting tab 46 (see FIG. 11) while also permitting the tether to extend in the roofward and the rearward directions B, D from the second tether end portion 98 to the first tether end portion.

Figure 11:
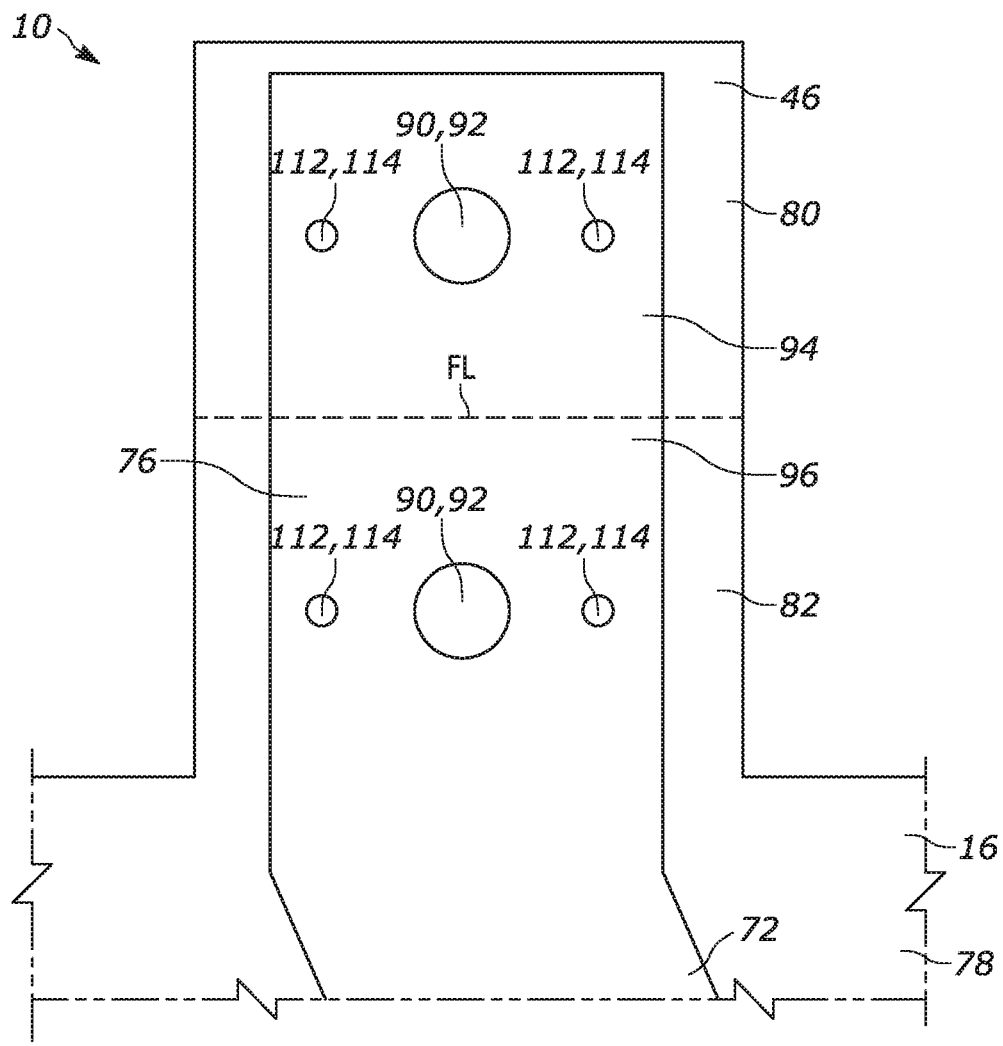
Figure 12:
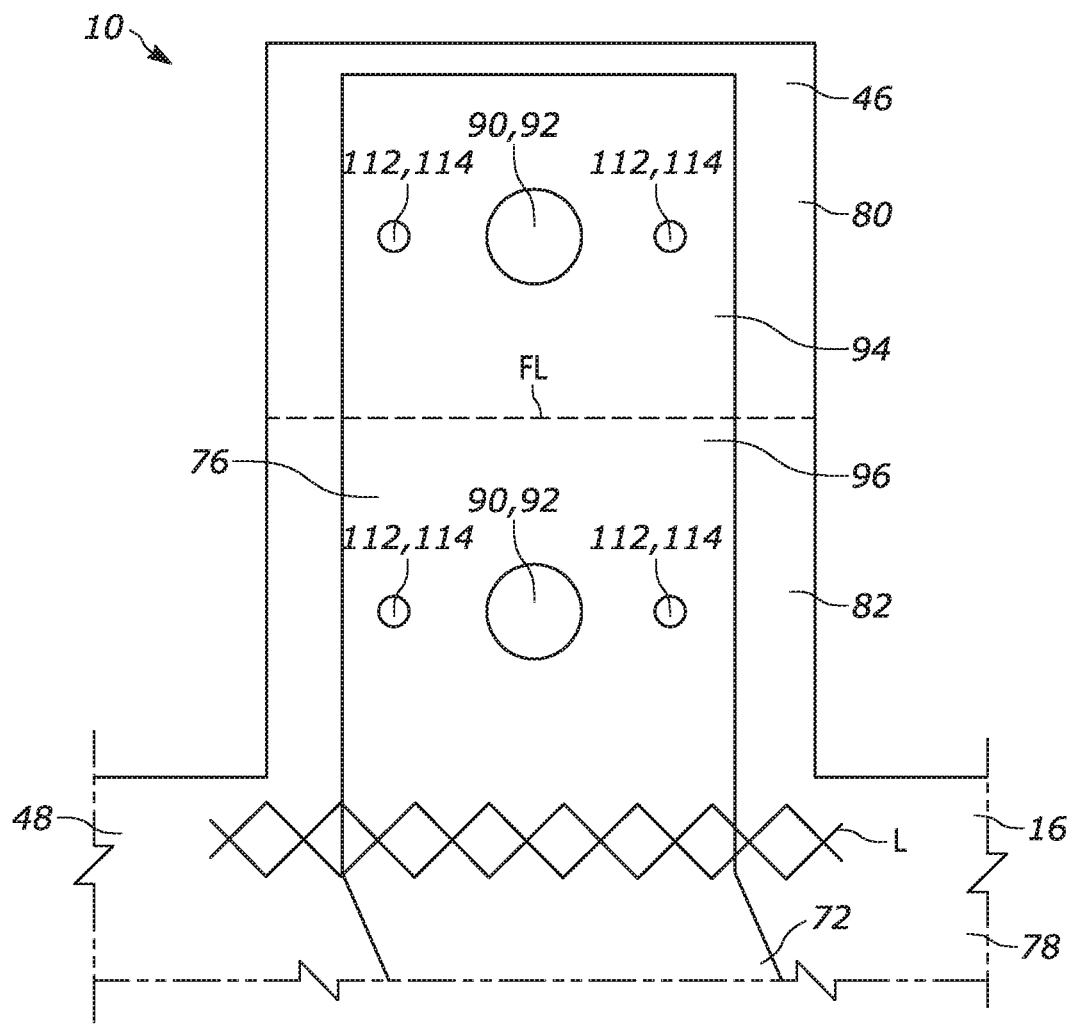

As shown in FIG. 11, the first tether end portion 76 can be positioned on the mounting tab 46 with the tether aperture 92 of the first portion 94 of the first tether end portion aligned with the mounting tab aperture 90 of the first portion 80 of the mounting tab 46. The tether aperture 92 of the second portion 96 of the first tether end portion 76 is also aligned with the mounting tab aperture 90 of the second portion 82 of the mounting tab 46. Further, the secondary apertures 114 of the first portion 94 of the first tether end portion 76 are aligned with the secondary apertures 112 of the first portion 80 of the mounting tab 46. The secondary apertures 114 of the second portion 96 of the first tether end portion 76 are also aligned with the secondary apertures 112 of the second portion 82 of the mounting tab 46. As shown in FIG. 12, once the first tether end portion 76 is positioned on and aligned with the mounting tab 46, a portion of the first tether end portion may be stitched or otherwise connected, as indicated by the stitch/connection lines "L" in FIG. 12, to the inboard side 78 of the curtain airbag 16. This connection may be adjacent to the mounting tab 46 and/or to the upper portion 48 of the curtain airbag 16.

Figure 13:
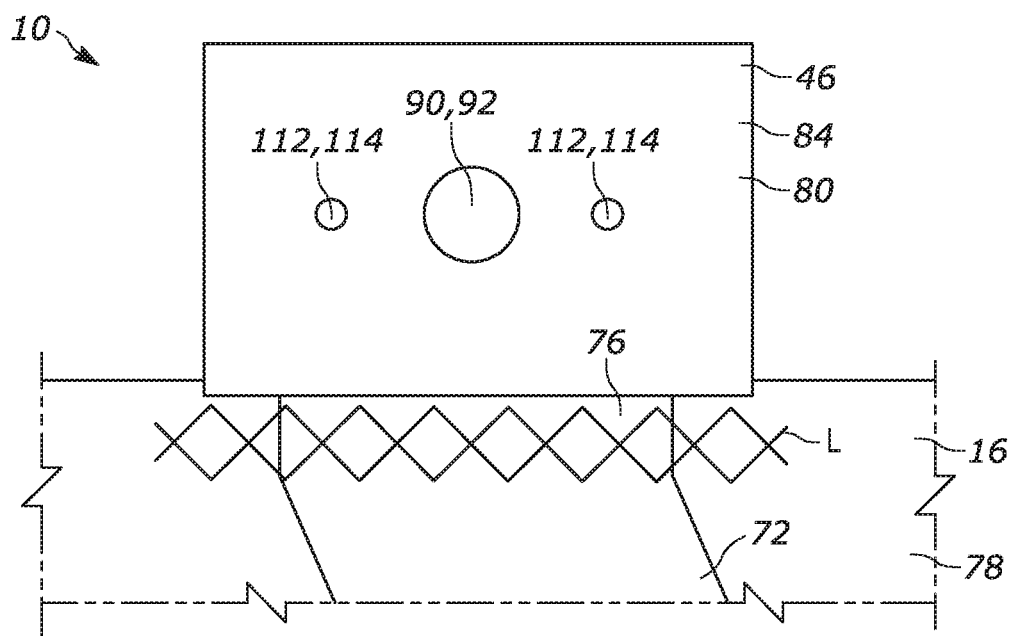

As shown in FIGS. 12-13, the first portions 94, 80 of both the first tether end portion 76 and the mounting tab 46 can then folded over about a fold-line, indicated at "FL" in FIG. 12, onto the second portions 96, 82 of both the first tether end portion and the mounting tab. The first and the second portions 80, 82 of the folded mounting tab 46 define the overlying layers 84 of the mounting tab. Thus, in this configuration, the folded first tether end portion 76 is positioned between the overlying layers 84 of the mounting tab 46.

Figure 14:
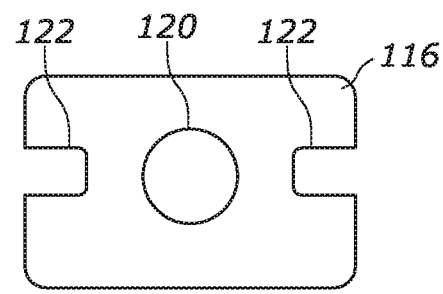
Figure 15:
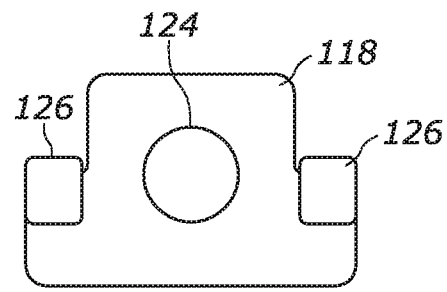

First and second brackets 116, 118, such as the ones depicted in FIGS. 14 and 15, respectively, can be provided to provide additional support for the folded mounting tab 46 and first tether end portion 76. The first and the second brackets 116, 118 are plates that can be at least partially formed from steel, aluminum, plastic, any other suitable material, or any combination thereof. The first bracket 116, as shown in FIG. 14, has a first bracket aperture 120 extending therethrough and at least one interlocking feature 122 in the form of a recess that extends through the first bracket. The first bracket 116 is depicted as having two recesses 122. The second bracket 118, as shown in FIG. 15, has a second bracket aperture 124 extending therethrough and at least one interlocking feature 126 in the form of an arm. The second bracket 118 is depicted as having two arms 126 that correspond to the two recesses 122 of the first bracket 116. The arms 126 of the second bracket 118 are configured to be positioned in the recesses 122 of the first bracket 116 to interlock the first and the second brackets.

Figure 16:
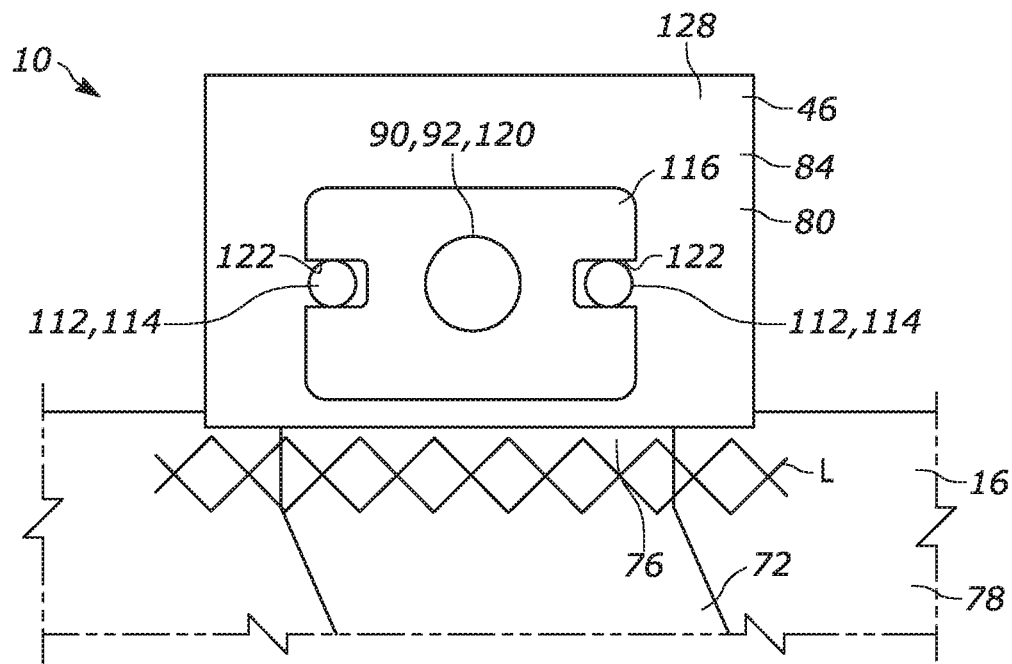
Figure 17:
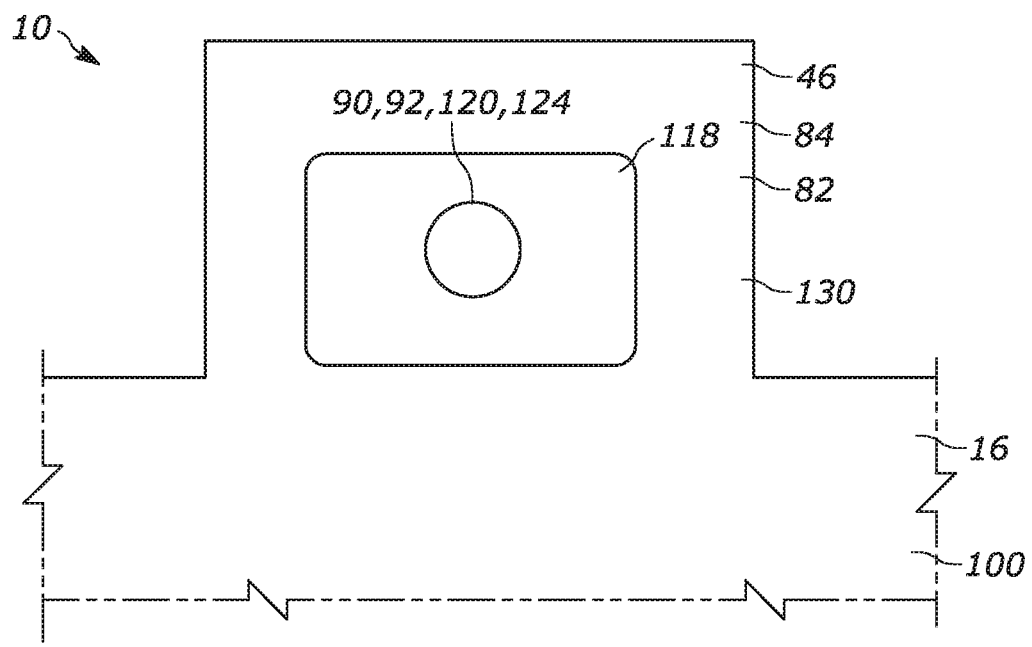
Figure 18:
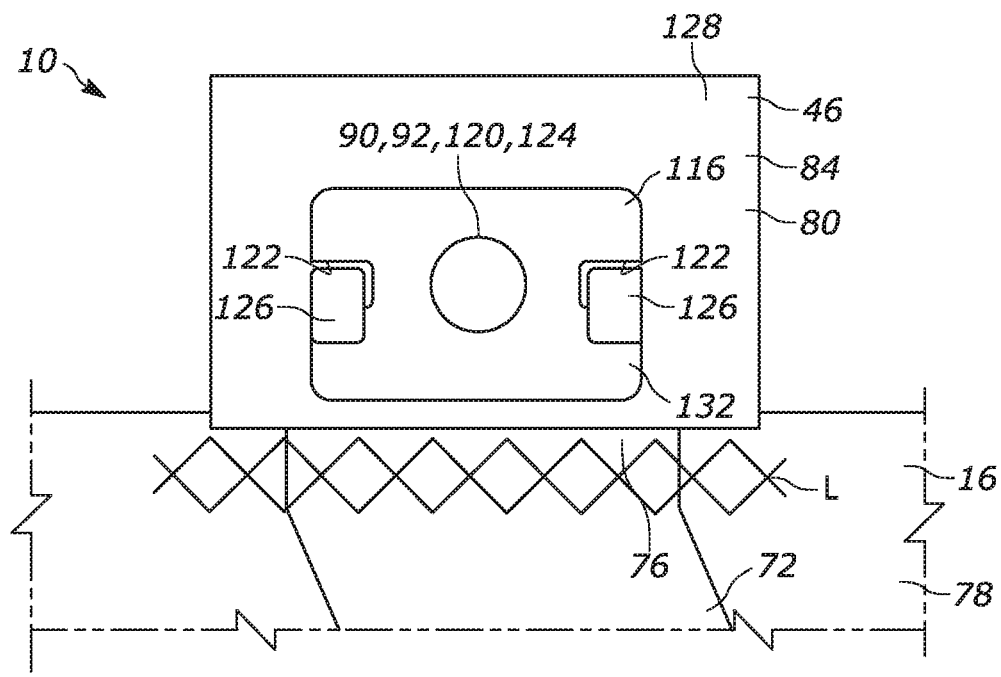

As shown in FIG. 16, the first bracket 116 can be positioned on the folded first portion 80 of the mounting tab 46 on an inboard side 128 of the mounting tab. The first bracket 116 is aligned on the mounting tab 46 with the first bracket aperture 120 aligned with the mounting tab and tether apertures 90, 92, and the recesses 122 aligned with the secondary apertures 112, 114 of the mounting tab and tether 72. As shown in FIGS. 17-18, the second bracket 118 can then be positioned on the second portion 82 of the mounting tab 46 on an outboard side 130 of the mounting tab. The second bracket 118 is aligned on the mounting tab 46 with the second bracket aperture 124 aligned with the mounting tab and tether apertures 90, 92. The arms 126 of the second bracket 118 extend through the secondary apertures 112 of the mounting tab 46, the secondary apertures 114 of the first tether end portion 76, and the recesses 122 of the first bracket aperture 116. With the arms 126 extending through the recesses 122, at least a portion of the arms engage a face 132 of the first bracket 116 to interlock the first bracket and the second bracket 118 together. Further, by extending through the secondary apertures 112, 114 of the mounting tab 46 and the tether 72 to interlock the first and the second brackets 116, 118 together, the arms 126 at least partially hold the folded first tether end portion 76 between the overlying layers 84 of the mounting tab.

Figure 19:
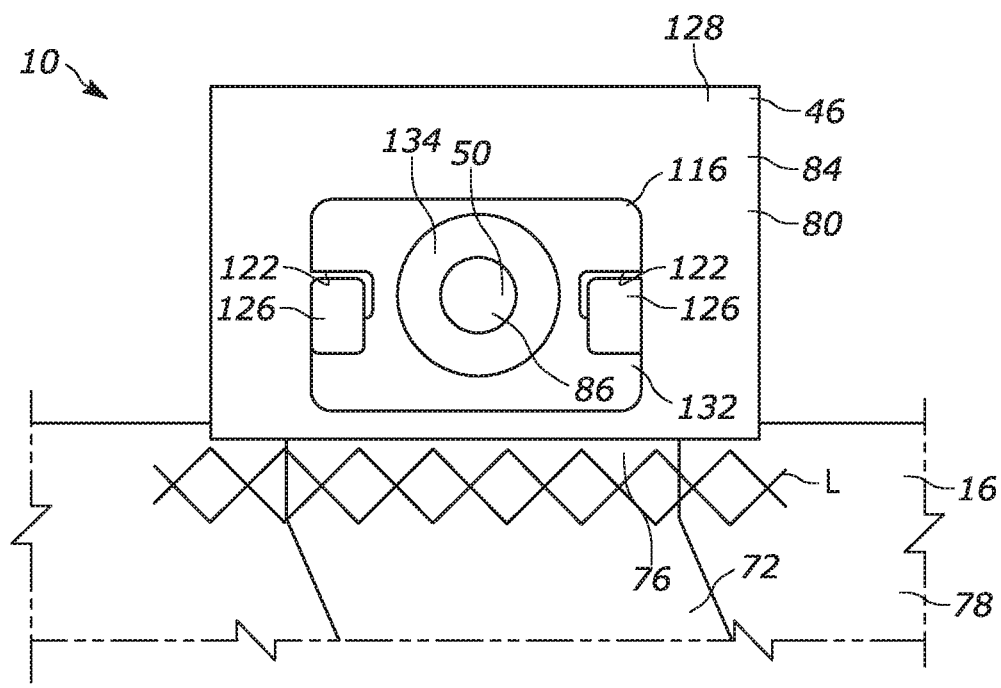
Figure 20:
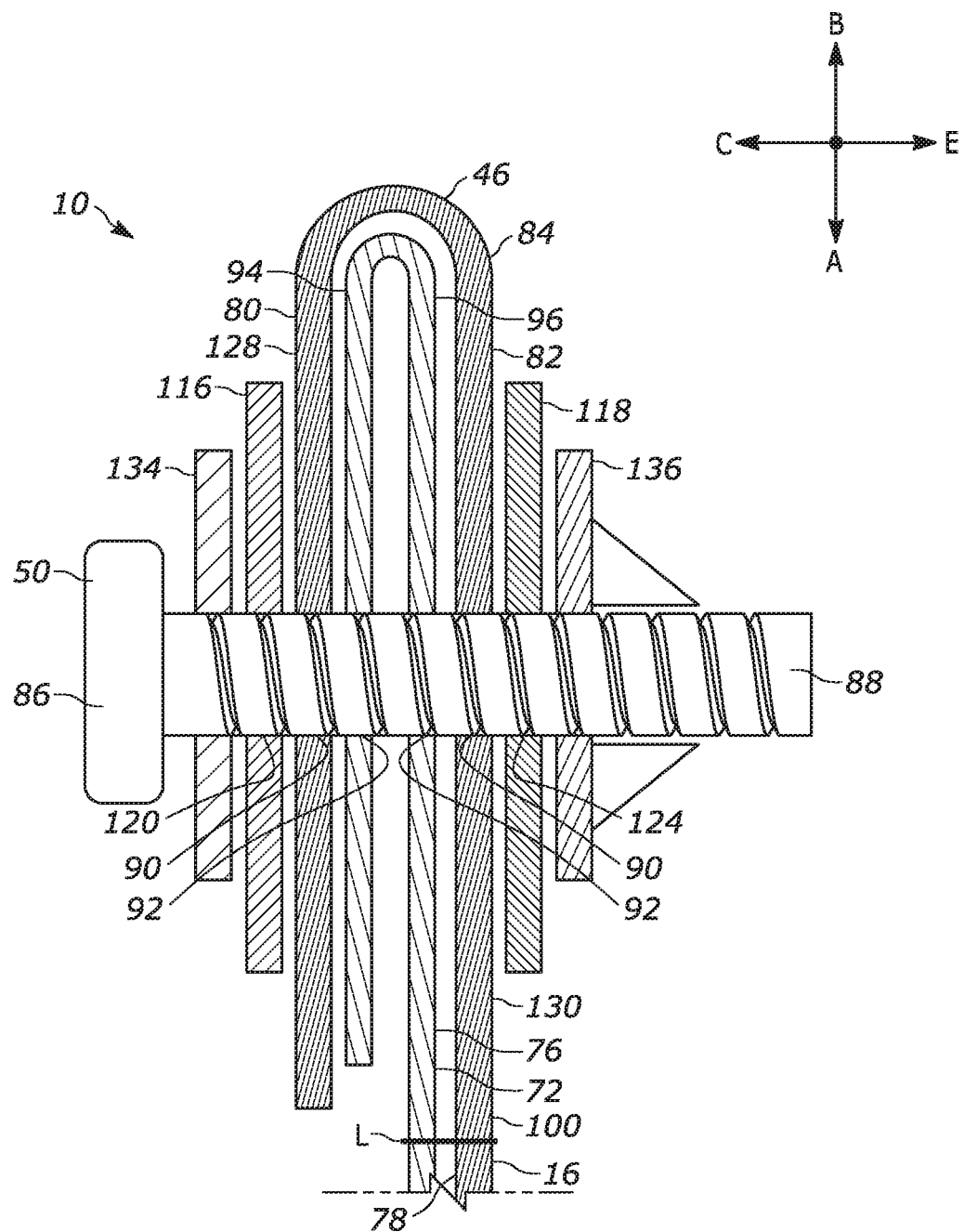

A washer 134 can then be slid onto the shank 88 of the threaded fastener 50. As shown in FIGS. 19-20, with the washer 134 on the shank 88, a portion of the shank is inserted through the first bracket aperture 120, the mounting tab aperture 90 of the first portion 80 of the mounting tab 46, the tether apertures 92, the mounting tab aperture of the second portion 82 of the mounting tab, and through the second bracket aperture 124 so that the head 86 of the threaded fastener and the washer are positioned on the inboard side 128 of the mounting tab. As shown in FIG. 20, a retainer 136 can then be slid onto the shank 88 from the outboard side 130 of the mounting tab 46 to retain the threaded fastener 50 positioned extending through the mounting tab, the tether 72, the first bracket 116, and the second bracket 118. The retainer 136 also retains the folded first tether end portion 76 between the overlying layers 84 of the mounting tab 46.

Figure 21:
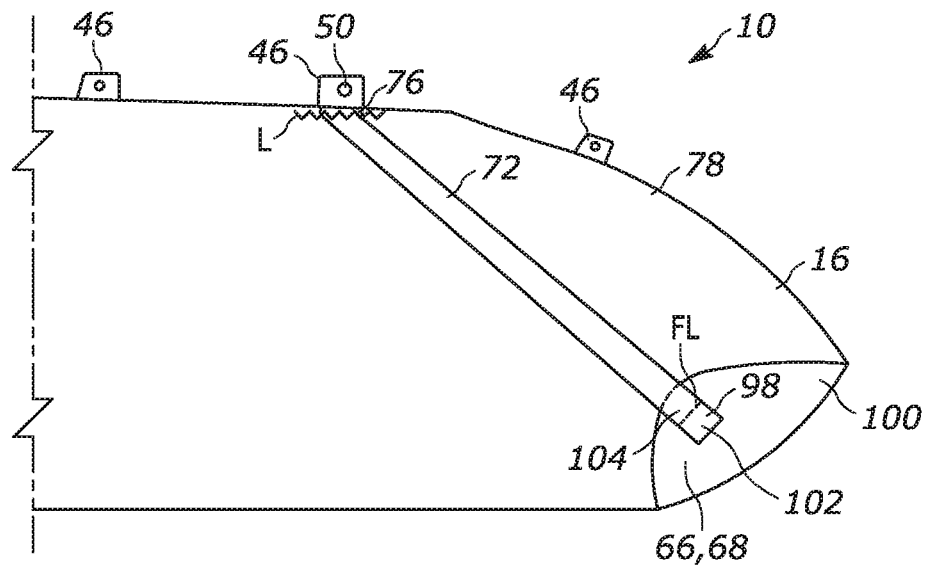
Figure 22:
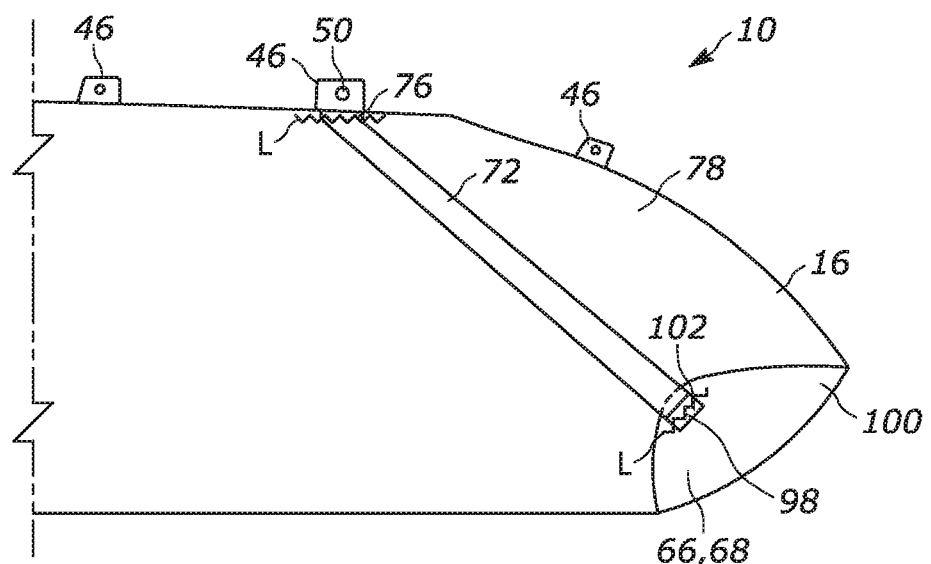

As shown in FIG. 21, the outboard side 100 of the lower front end portion 68 of the curtain airbag 16 can then be folded in the inboard direction C toward the first tether end portion 76 so that the inboard side 78 of the curtain airbag at the lower front end portion of the curtain airbag is folded over onto an adjacent inboard side portion of the curtain airbag. In this configuration, the outboard side 100 of the folded lower front end portion 68 faces in the inboard direction C. The first portion 102 of the second tether end portion 98 can be folded over a fold-line, indicated at "FL" in FIG. 21, onto the second portion 104 of the second tether end portion. As depicted in FIG. 22, the folded second tether end portion 98 can then be stitched or otherwise connected, as indicated by the stitch lines "L" in FIG. 22, to the outboard side 100 of the curtain airbag 16 at the folded lower front end portion 68 of the curtain airbag.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
    a curtain airbag inflatable from a stored condition to a deployed condition in which the curtain airbag is positioned between a side structure of the vehicle and the vehicle occupant, the curtain airbag comprising a mounting tab for mounting the curtain airbag to a support structure of the vehicle; and
    a tether having first and second tether end portions, the first tether end portion being stitched to an inboard side of the curtain airbag adjacent the mounting tab with the first tether end portion overlying a portion of the mounting tab so that a fastener aperture in the first tether end portion aligns with a fastener aperture in the mounting tab, the second tether end portion being connected to an outboard side of the curtain airbag;
    wherein in the deployed condition of the curtain airbag, the tether is tensioned and holds a portion of the curtain airbag proximate to the second tether end portion folded in an inboard direction away from the side structure.

2. The apparatus recited in claim 1, wherein as a result of the tether being connected to both the inboard side of the curtain airbag and the outboard side of the curtain airbag, the portion of the curtain airbag proximate to the second tether end is substantially held inboard of the vehicle and substantially prevented from pivoting outboard of the vehicle.

3. The apparatus recited in claim 1, wherein the second tether end portion is stitched or otherwise connected to the outboard side of the curtain airbag at a lower end portion of the curtain airbag, a portion of the lower end portion being held folded in the inboard direction away from the side structure by the tether when the curtain airbag is in the deployed condition.

4. The apparatus recited in claim 3, wherein a first portion of the second tether end portion is folded over onto a second portion of the second tether end portion, the folded second tether end portion being stitched or otherwise connected to the outboard side of the curtain airbag at the lower end portion of the curtain airbag.

5. The apparatus recited in claim 3, wherein the tether is tensioned as the curtain airbag inflates and deploys to substantially prevent the lower end portion of the curtain airbag from deploying outboard of the vehicle.

6. The apparatus recited in claim 3, wherein in the deployed condition, the tether extends in both a rearward direction and a roofward direction from the second tether end portion to the first tether end portion, the extension of the tether in both the rearward and the roofward directions causing the lower end portion to be further held folded in the roofward and the rearward directions.

7. The apparatus recited in claim 1, wherein the tension in the tether is configured to increase when the occupant, moving in an outboard direction, impacts the curtain airbag, the increase of tension in the tether counteracting the outboard directed impact forces proximate to the second tether end to substantially prevent the portion of the curtain airbag proximate to the second tether end from moving in the outboard direction.

8. The apparatus recited in claim 7, wherein the second tether end portion is stitched or otherwise connected to the outboard side of the curtain airbag at a lower end portion of the curtain airbag, and wherein as a result of the increased tension in the tether, the lower end portion of the curtain airbag is substantially prevented from moving outboard of the vehicle.

9. The apparatus recited in claim 1, wherein as a result of the tether being connected to the outboard side of the curtain airbag and the inboard side of the curtain airbag at the mounting tab, the portion of the curtain airbag proximate to the second tether end portion is held folded over onto an adjacent portion of the curtain airbag to produce a fold in the curtain airbag, the formation of the fold in the curtain airbag causing the inboard side of the curtain airbag proximate to the second tether end portion to be folded over onto an adjacent inboard side portion of the curtain airbag so that the outboard side of the curtain airbag proximate to the second tether end portion faces in the inboard direction.

10. The apparatus recited in claim 1, wherein a vertical height of the tether is less than a vertical height of the curtain airbag, and wherein as a result of the vertical height of the tether being less than the vertical height of the curtain airbag, the portion of the curtain airbag proximate to the second tether end portion is held folded toward the first tether end portion when the curtain airbag is in the deployed condition.

11. The apparatus recited in claim 1, wherein the mounting tab comprises overlying layers of airbag material with each of the overlying layers having the fastener aperture of the mounting tab extending therethrough, and wherein the first tether end portion is positioned between the overlying layers of the mounting tab with the fastener aperture of the tether aligned with the fastener apertures of the mounting tab.

12. The apparatus recited in claim 11, wherein the overlying layers of the mounting tab comprises a first portion that is folded over onto a second portion.

13. The apparatus recited in claim 11, further comprising a fastener having a portion extending though each of the fastener apertures, and the tether aperture, and wherein a portion of the fastener is configured to extend into the support structure of the vehicle to mount the apparatus to the support structure.

14. The apparatus recited in claim 11, further including first and second brackets configured to be interlocked with one another, each of the first and the second brackets having a bracket aperture extending therethrough, the first bracket being positioned on an inboard side of the mounting tab, the second bracket being positioned on the outboard side of the mounting tab and interlocked with the first bracket, the first and the second bracket apertures being aligned with the fastener aperture in the tether and the fastener apertures in the mounting tab.

15. The apparatus recited in claim 11, wherein a first portion of the first tether end portion is folded over onto a second portion of the first tether end portion, each of the first and the second portions of the first tether end portion having the fastener aperture of the tether extending therethrough, the folded first tether end portion being positioned between the overlying layers of the mounting tab with the fastener apertures of the tether aligned with the fastener apertures of the mounting tab.

16. The apparatus recited in claim 15, further including a fastener having a portion extending though each of the fastener apertures, and wherein a portion of the fastener is configured to extend into a support structure of the vehicle to mount the apparatus to the support structure.

17. The apparatus recited in claim 16, wherein a first portion of the second tether end portion is folded over onto a second portion of the second tether end portion, the folded second tether end portion being stitched or otherwise connected to the outboard side of the curtain airbag.

18. The apparatus recited in claim 1, wherein the curtain airbag comprises a plurality of mounting tabs spaced along the length of an upper portion of the curtain airbag, and wherein the first tether end portion is connected to the inboard side of the curtain airbag at one of the mounting tabs.

19. An apparatus for helping to protect an occupant of a vehicle, comprising:
  a curtain airbag inflatable from a stored condition to a deployed condition in which the curtain airbag is positioned between a side structure of the vehicle and the vehicle occupant, the curtain airbag comprising a mounting tab for mounting the curtain airbag to a support structure of the vehicle, the mounting tab comprising overlying layers of airbag material; and
  a tether having first and second tether end portions, the first tether end portion being connected to an inboard side of the curtain airbag at the mounting tab and positioned between the overlying layers of the mounting tab, the second tether end portion being connected to an outboard side of the curtain airbag at a lower end portion of the curtain airbag, the tether substantially preventing the lower end portion from deploying outboard of the vehicle as the curtain airbag deploys.

20. An apparatus for helping to protect an occupant of a vehicle, comprising:
  a curtain airbag inflatable from a stored condition to a deployed condition in which the curtain airbag is positioned between a side structure of the vehicle and the vehicle occupant, the curtain airbag comprising a mounting tab for mounting the curtain airbag to a support structure of the vehicle, the mounting tab comprising an integral woven portion of the curtain airbag;
  a tether having first and second tether end portions, the first tether end portion being connected to the mounting tab on an inboard side of the curtain airbag, the second tether end portion being connected to an outboard side of the curtain airbag; and
  a fastener having a portion extending though the tether and the mounting tab to connect the tether to the mounting tab, a portion of the fastener being configured to extend into the support structure of the vehicle to mount the apparatus to the support structure;
  wherein in the deployed condition of the curtain airbag, the tether is tensioned and holds a portion of the curtain airbag proximate to the second tether end portion folded in an inboard direction away from the side structure.

* * * * *